Feb. 7, 1928. 1,658,313
J. WAHL ET AL
DEFLATING MACHINE
Original Filed Aug. 7, 1924  2 Sheets-Sheet 1
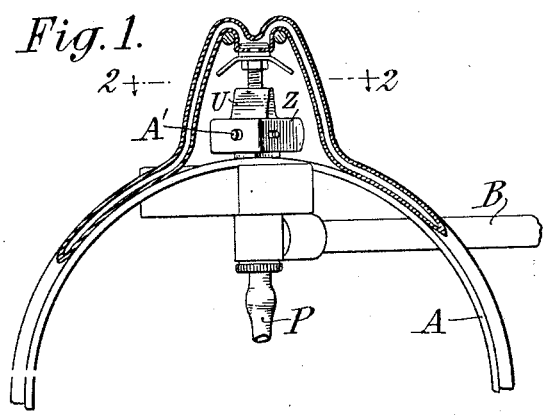
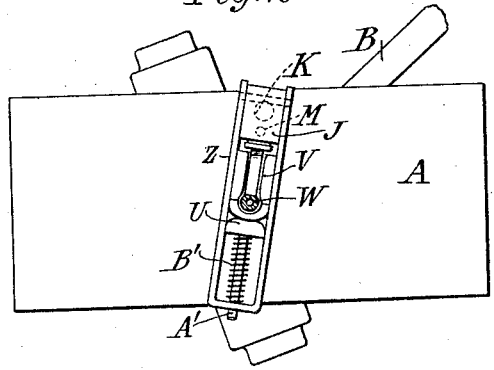
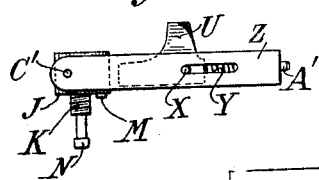
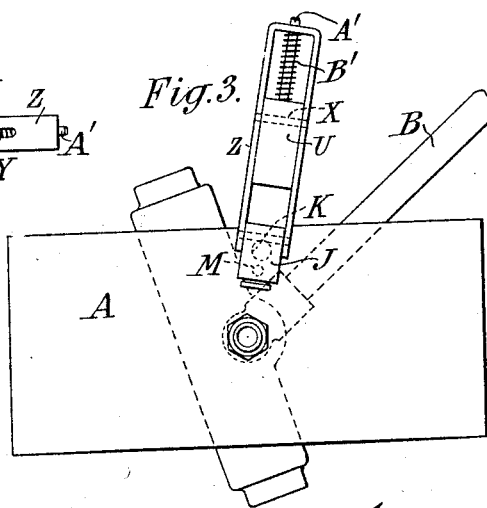
INVENTORS:
John Wahl and
Otto Melzer,
By Attorneys, Feb. 7, 1928. 1,658,313
J. WAHL ET AL
DEFLATING MACHINE
Original Filed Aug. 7, 1924  2 Sheets-Sheet 2
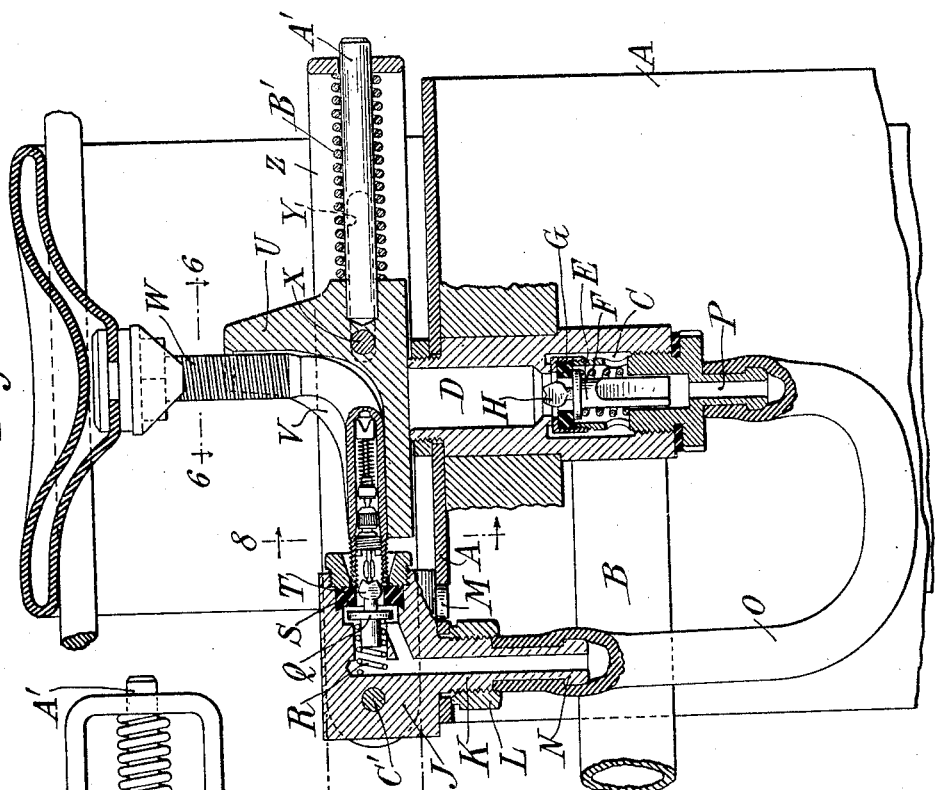
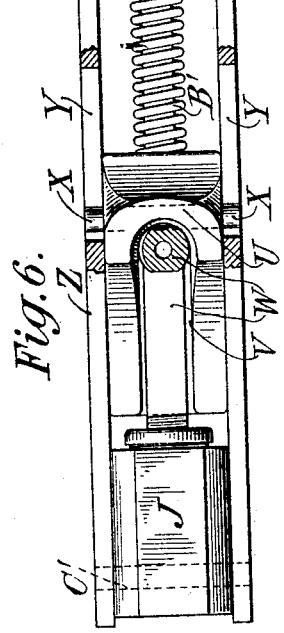
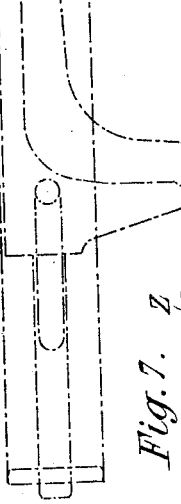
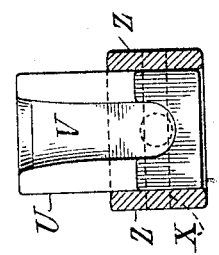
INVENTORS:
John Wahl and
Otto Melzer,
By Attorneys, Patented Feb. 7, 1928.

1,658,313

UNITED STATES PATENT OFFICE.

JOHN WAHL, OF ROSEDALE, AND OTTO MELZER, OF HOLLIS, NEW YORK, ASSIGNORS TO A. SCHRADER'S SON, INC., OF BROOKLYN, NEW YORK, A CORPORATION OF NEW YORK.

DEFLATING MACHINE.

Application filed August 7, 1924, Serial No. 730,779. Renewed November 17, 1927.

This invention relates to machines for deflating tire tubes, and particularly those of the type set forth in the patents to Henry P. Kraft, Nos. 1,297,186 and 1,405,230.

The machines illustrated in the aforesaid patents are designed for deflating tubes having straight valves, and include a tube support upon which the tube is mounted, said support having a socket or recess in which the end of the valve is placed, such socket or recess having an inwardly opening valve which is unseated by the entering tire valve, and also having means for opening the valve check so that communication is established between an air pump connected with the socket and the interior of the tire tube. Such machines having multiple sockets of the character described have gone generally into use. The object of the present invention is to provide a machine of this type which is capable of deflating tubes having angular or bent valves, but preferably the invention takes the form of an attachment which is capable of being applied to machines of the type aforesaid so as to make the latter interchangeably fitted to deflate valves of both types.

Tubes having bent or angled valves are usually employed in connection with disk wheels or other wheels of a type in which it is desired to dispose the inflating end of the valve at right angles to the plane of the wheel rather than radially of the latter. The invention in its preferred form, hence, provides a fitting which is capable of attachment to the machine, the fitting having a valve receiving support or clamp and a valve receiving socket similar to those described in said patents, but disposed at an angle to the plane of the circle comprised by the tube, the clamp being adapted to hold the valve in position in the socket during the operation of deflation. The clamp device is preferably so mounted upon the tube support that it may easily be swung or be otherwise moved out of the way when it is desired to deflate tubes having straight valves. The device comprises other features of novelty which will be hereinafter pointed out.

Referring to the drawings which illustrate one form of the invention:

Figure 1 is an elevation of tube supports similar to those shown in the aforesaid patents having the device of the present invention applied thereto, a tube being shown as mounted thereon in the position for deflation.

Fig. 2 is a plan view of Figure 1 with the tube removed and the device of the present invention in position.

Fig. 3 is a view similar to Fig. 2 showing the bent valve attachment swung back out of the way.

Fig. 4 is an elevation of the attachment detached.

Fig. 5 is an enlarged view of the bent valve attachment in position, the parts being shown mainly in section.

Fig. 6 is a plan of the bent valve attachment on a large scale.

Fig. 7 is a detail of the socket end of the bent valve attachment.

Fig. 8 is a section taken on the line 8—8 in Fig. 5.

Referring to the drawings, let A indicate the support for the tube which is in the nature of a band of metal curved in form around which the tube is stretched. B is a pipe leading to some form of exhaust or suction apparatus. The pipe B is connected with a valve chamber C formed at the bottom of a socket piece D, and in valve chamber C is mounted a valve E which is normally closed under the influence of a spring F notwithstanding the tendency of the suction to open it. The valve E seats against a suitable packing G, and carries with it a valve opener H which when the ordinary straight valve is inserted in the socket D contacts with the pin of the valve check in the tire valve and opens the latter. The end of the tire valve nipple also engages the projection H, and by the weight of the tube opens the valve E, thus establishing communication between the suction pipe B and the interior of the tire tube. At the same time the valve nipple engages the packing G and makes a leak tight connection between the socket member and valve. As thus far described the device corresponds to those disclosed in the aforesaid patents.

The preferred form of the present invention is best illustrated in Fig. 5, and comprises a socket piece J which has a shank K which passes through a hole in the support A, the device being clamped thereto by a nut L. The socket piece J is also provided with a stud M which fits in a hole in the support A, and thus prevents the socket piece from turning. The extension K is formed at its lower end, has a tubular nipple N which is connected by a rubber tube O with a nipple P which is screw-threaded into the bottom of the socket piece D.

By this construction it will be seen that the air will be exhausted through the pipe B from both the socket piece D and the socket piece J.

The socket piece J is constructed similarly to the socket piece D, it being provided with a valve Q seated by a spring R, and having a packing S. The valve Q has a valve opener T serving the function of opening the tire valve, and also of being engaged by the tire valve nipple to open the valve Q.

We provide a clamping member U which is formed with a groove V designed to receive the angled or bent portion of the valve W. The clamping member U is provided with pins X X which slide in slots Y formed in a frame Z so that the clamping member may be reciprocated within the frame. The clamping member is also provided with a pin A' which passes through the end of the frame Z, and which guides a spring B', the normal tendency of which is to press the clamping member U forwardly so as to hold the tire valve with its nipple in the socket member J. In inserting the valve the clamp is moved back, the valve being placed in the groove V and the clamping member released, whereupon the nipple of the valve is pressed into the socket so that the nipple makes a tight joint with the socket member, preferably by contacting with the gasket S. This may be very easily and quickly accomplished by the operator.

Preferably the frame and clamping member are swung back out of the way so that when tubes are to be deflated which are provided with straight valves they will not be interfered with by the clamp. Preferably this is accomplished by pivoting the clamp to the socket member at C' so that it may be swung over to the position shown in dotted lines in Fig. 5, and in full lines in Fig. 3.

The construction which is shown and described is the preferred form of the invention, but it may be modified without departing from the spirit of the invention. By the use of the preferred form of the invention wherein it is constructed as an attachment, existing machines may be readily fitted for deflating tubes having bent valves, and practically instantaneously changed to accommodate tubes having straight valves. It will be understood that as many of the devices shown may be used as may be necessary in multiple machines.

What we claim is:

1. In a deflating machine for tubes or the like having angular valves, a valve opener disposed in line with the free end of the valve, and a slidable clamp in alignment with and movable into engagement with the valve and means for holding the valve against said valve opener.

2. In a deflating machine for tubes or the like having angular valves, a valve opener disposed in line with the free end of the valve, said valve opener adapted to be engaged by the free end of the tire valve, and means for holding the tire valve in such engaging position, said means comprising a sliding clamp having a recess to engage the valve.

3. A deflating machine having separate means for engaging an angular and a straight tire valve to unseat the same, the means for unseating the angular tire valve being positioned at an angle to the general plane of the tube to be deflated, and a clamping device adapted to bear against the angular valve intermediate its ends for holding the valve against the angular valve unseating means.

4. A tire deflating machine having a support for holding the tube to be deflated in a substantially vertical position, and separate valve unseating means for engaging an annular and a straight tire valve of such tube to unseat the same, said means being positioned angularly with respect to one another.

5. In combination with a deflating machine having a support for holding the tube to be deflated in a substantially vertical position and a radially arranged valve receiving socket having a valve opener, an attachment mounted on the tube support adapting the machine for use with bent or angular valves, said attachment comprising a socket having a valve opener disposed angularly to the radially arranged socket, and means for holding the free end of an angular valve against the second valve opener.

6. In combination with a deflating machine having a support for holding the tube to be deflated in a substantially vertical position and a radially arranged valve receiving socket having a valve opener, an attachment mounted on the tube support adapting the machine for use with bent or angular valves, said attachment comprising a horizontally directed valve receiving socket connected with the exhaust pipe of the machine, means for mounting said socket on the tube support of the machine and a clamping member adapted to engage a bent valve to hold the free end thereof in said horizontally arranged receiving socket.

7. An attachment for deflating machines having a support for holding the tube to be deflated in a substantially vertical position, said attachment comprising a horizontally directed valve receiving socket connected with a suction device, means for mounting said valve receiving socket on the tube support of the machine, and a clamping member adapted to engage a bent valve to hold the free end thereof in said horizontally arranged valve receiving socket, and means for pivoting said clamp to said horizontal valve receiving support whereby it may be moved to an inoperative position.

8. A deflating machine having means for engaging the valve of an angular or bent tire valve to unseat the same, said means being positioned at an angle to the general plane of the tube to be deflated, and a clamping device adapted to bear against the angular or bent tire valve intermediate its ends for holding said tire valve against the valve unseating means.

In witness whereof, we have hereunto signed our names.

JOHN WAHL.
OTTO MELZER.